(12) United States Patent
Roth et al.

(10) Patent No.: US 9,676,372 B2
(45) Date of Patent: Jun. 13, 2017

(54) SNOW AND ICE REMOVAL SYSTEM

(71) Applicant: ARCTIC SNOW REMOVAL SYSTEMS, LLC, Shippensburg, PA (US)

(72) Inventors: Calvin W. Roth, Newville, PA (US); Henry Thissen, Shippensburg, PA (US)

(73) Assignee: Arctic Air Snow Removal Systems, LLC, Shippensburg, PA (US)

( * ) Notice: Subject to any disclaimer, the term of this patent is extended or adjusted under 35 U.S.C. 154(b) by 360 days.

(21) Appl. No.: 14/324,854

(22) Filed: Jul. 7, 2014

(65) Prior Publication Data
US 2015/0013097 A1     Jan. 15, 2015

Related U.S. Application Data

(60) Provisional application No. 61/843,973, filed on Jul. 9, 2013.

(51) Int. Cl.
*B60S 3/04* (2006.01)
*B08B 5/02* (2006.01)
*B60S 3/00* (2006.01)

(52) U.S. Cl.
CPC ............... *B60S 3/04* (2013.01); *B08B 5/023* (2013.01); *B60S 3/00* (2013.01)

(58) Field of Classification Search
CPC .. B60S 3/002; B60S 3/04; F28G 3/166; F28G 15/04; F28G 3/16; B08B 15/023; B08B 5/023
See application file for complete search history.

(56) References Cited

U.S. PATENT DOCUMENTS

| | | | | |
|---|---|---|---|---|
| 3,509,590 A | * | 5/1970 | Koshiyama | A47L 5/365 15/323 |
| 3,648,316 A | * | 3/1972 | Habian | B64F 5/30 15/24 |
| 4,872,238 A | * | 10/1989 | Crotts | B60S 3/002 15/302 |
| 5,072,487 A | * | 12/1991 | Walton | B08B 9/035 134/167 C |
| 5,513,598 A | * | 5/1996 | Zapparoli | A01K 13/001 119/600 |
| 8,480,011 B2 | * | 7/2013 | Endo | B05B 3/022 239/226 |
| 2002/0148066 A1 | * | 10/2002 | Bullis | A47L 11/03 15/321 |
| 2006/0289036 A1 | * | 12/2006 | Hilton | E04D 13/0765 134/22.11 |
| 2007/0074357 A1 | * | 4/2007 | Reed | B60S 3/04 15/3 |
| 2007/0089262 A1 | * | 4/2007 | Drevitson | A47L 5/14 15/339 |
| 2010/0059089 A1 | | 3/2010 | Opdyke | |
| 2012/0152291 A1 | | 6/2012 | Quinn | |

* cited by examiner

*Primary Examiner* — Robert Scruggs
(74) *Attorney, Agent, or Firm* — McNees Wallace & Nurick LLC (57) ABSTRACT

A snow and ice removal system for removing frozen precipitation from an exterior surface of a vehicle, including a base including a device for pressurizing air and a conduit for conveying pressurized air from the device to an upper exterior surface of a vehicle. The system is portable and self-contained.

11 Claims, 7 Drawing Sheets

SNOW AND ICE REMOVAL SYSTEM

This application claims priority from and the benefit of U.S. Provisional Patent Application No. 61/843,973, filed Jul. 9, 2013, entitled "VEHICLE SNOW REMOVAL SYSTEM", which is hereby incorporated by reference.

FIELD OF THE INVENTION

The present invention is generally directed to the removal of snow, and more particularly to a system for removing snow from the surface of a truck trailer.

BACKGROUND OF THE INVENTION

The accumulation of snow and ice, hereinafter referred to as "frozen precipitation" on the surface or roof of road vehicles such as semi-trailer trucks and other large vehicles presents a substantial problem. Frozen precipitation may accumulate on the roof of the vehicle while the vehicle is stopped, parked or otherwise stationary, and may also accumulate on the vehicle roof while the vehicle is moving.

If the frozen precipitation is not removed from the roof of the vehicle, slabs or other solid mass forms of the frozen precipitation may become separated from the vehicle roof and fly off or otherwise fall from the moving vehicle. The flying mass may strike or impact one or more vehicles following behind the moving vehicle, may cause another vehicle to swerve to avoid the flying mass, and/or may form an obstruction on the road surface. In such a manner, the flying and/or obstruction mass may cause damage or lead to an accident. For example, the flying mass may impact and break a windshield of a following car and result in one or more accidents. For at least these reasons, some jurisdictions require that ice and/or snow be removed from a vehicle before the vehicle may travel on roadways.

In response, removal of frozen precipitation from the roof of a vehicle has been achieved by brushing. Unfortunately, the brush makes contact with the roof of the vehicle, and can cause damage to the roof.

In other attempts, an operator may move the vehicle to or into a facility where the frozen precipitation is removed by heating and/or spraying with de-icing and/or melting agents. However, these attempts are only practical wherein a large number of vehicles are present so as to justify the expense thereof. They do not provide a solution for a single or few vehicles that can be in a location wherein such a structure is not available.

Therefore, a long felt need exists to economically remove frozen precipitation from a surface of a road vehicle.

What is needed is a system to remove frozen precipitation from the roof of a road vehicle, and in particular, to non-invasively remove frozen precipitation from a large vehicle such as a tractor-trailer.

SUMMARY OF THE INVENTION

A first aspect of the disclosure includes a snow and ice removal system for removing frozen precipitation from an exterior surface of a vehicle, including a base including a device for pressurizing air and a conduit for conveying pressurized air from the device to an upper exterior surface of a vehicle. The system is portable and self-contained.

A second aspect of the disclosure includes a snow and ice removal system for removing frozen precipitation from an exterior surface of a vehicle, including a base including a device for pressurizing air. The system includes a conduit for conveying pressurized air from the device to an upper exterior surface of a vehicle. The system includes a support structure for supporting the conduit, the support structure having opposed ends, one end of the support structure being secured to the base. The system is portable and self-contained.

A third aspect of the disclosure includes a snow and ice removal system for removing frozen precipitation from an exterior surface of a vehicle, including a base including a device for pressurizing air. The system includes a conduit for conveying pressurized air from the device to an upper exterior surface of a vehicle. The system includes a support structure for supporting the conduit, the support structure having opposed ends, one end of the support structure being secured to the base. The support structure includes a substantially vertical first portion having one end secured to the base and a substantially horizontal second portion secured to the other end of the first portion, the support structure resembling an inverted "L". The system is portable and self-contained.

Other features and advantages of the present invention will be apparent from the following more detailed description of the preferred embodiment, taken in conjunction with the accompanying drawings which illustrate, by way of example, the principles of the invention.

DETAILED DESCRIPTION OF THE INVENTION

Figure 1:
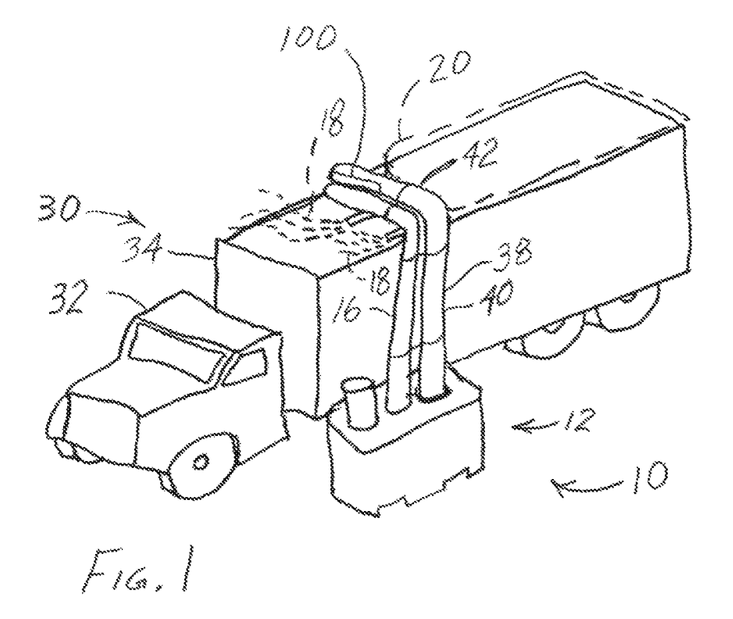
FIG. 1 illustrates an upper perspective view of an exemplary embodiment of a snow and ice removal system.
Figure 2:
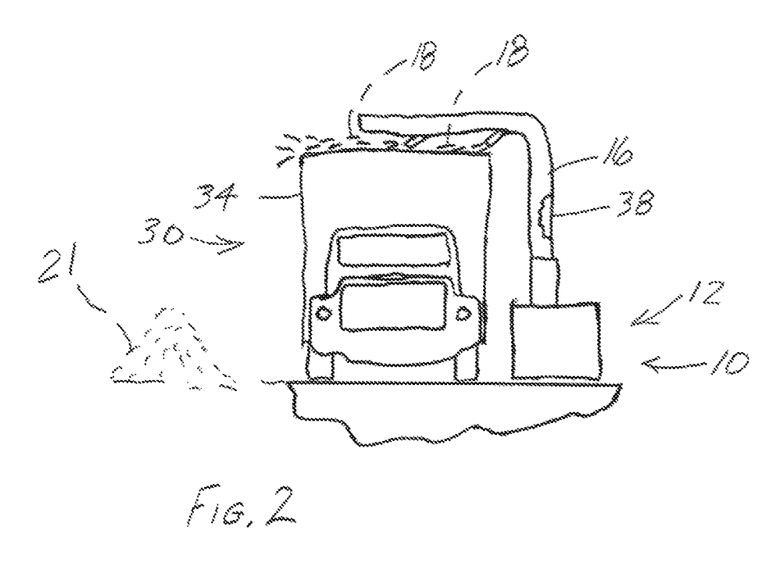
FIGS. 2-4 illustrate a front elevation view, a plan view and a side elevation view, respectively, of the snow and ice removal system of FIG. 1.
Figure 3:
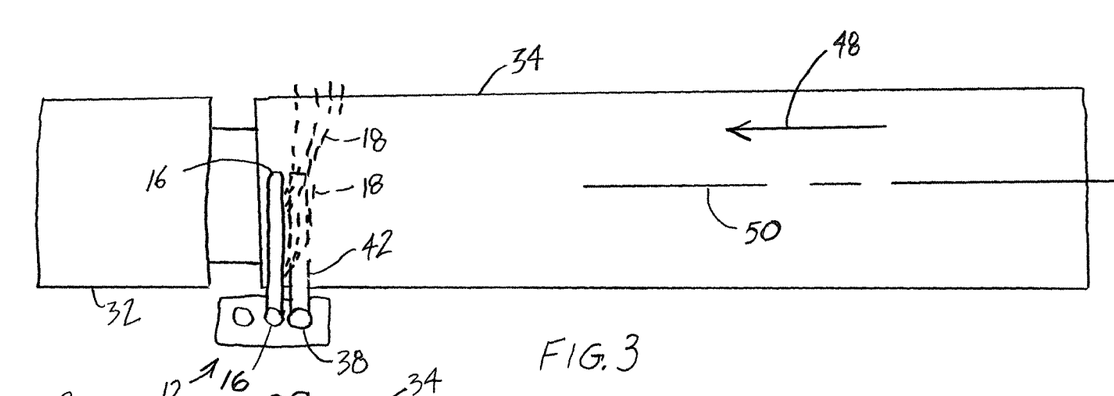
Figure 4:
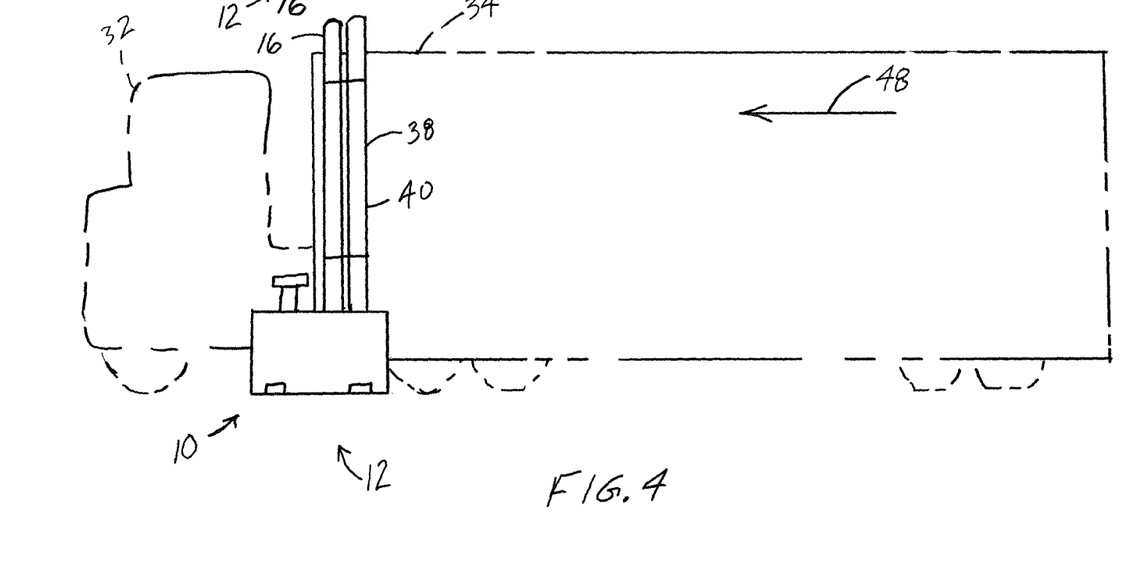

FIG. 1 illustrates a road vehicle 30 including a towing engine or trailer 32 and a semi-trailer 34 having an exemplary embodiment of a snow and ice removal system (system) 10 according to the disclosure attached thereto. Within this disclosure, the term "snow and ice" includes any form of frozen precipitation, including, but not limited to snow, ice, sleet, freezing rain and hail. Furthermore, in this exemplary embodiment, the road vehicle is a tractor trailer. However, in other embodiments, the road vehicle 30 may be any vehicle, motorized or non-motorized, that travel on a road, such as, but not limited to box trucks, trailers, semi-trailers, towed oversized structures including housing structures and mobile homes, buses and the like.

As can be seen in FIGS. 1-4, system 10 includes a base 12, such as a housing or enclosure from which extends a support structure 38 for supporting a conduit 16 that also extends from base 12. As further shown in FIG. 1, a support structure 38 comprises a generally vertical first portion 40 that is secured at one end to base 12, resembling an inverted "L". A generally horizontal second portion 42 extends from an end of first portion 40 of support structure 38 that is opposite base 12. Conduit 16, which is connected to a device 14 (FIG. 7) for providing pressurized air 18 for removal of frozen precipitation 20 from the upper exterior surface of semi-trailer 34 is secured to first portion 40 and second portion 42 of support structure 38, such as by straps, fasteners, or other arrangement or technique. Removed frozen precipitation 21 (FIG. 2) substantially accumulates on one side of vehicle 30 opposite snow and ice removal system 10, providing a predictable, consistent location for the accumulating removed frozen precipitation 21. This consolidated arrangement of removed frozen precipitation 21 provides multiple advantages, including reducing the number of passes by a device for clearing the removed frozen precipitation 21, if required, and substantially preventing the removed frozen precipitation from being mixed with intake air provided to device 14. By substantially preventing mixing/recirculation of frozen precipitation 21 with intake air provided to device 14, which could otherwise cause freezing of components of device 14, heating of intake air is not required, greatly simplifying the operation and operating costs of the system.

It is to be understood that the base 14 may be positioned at different angular orientations from those shown in an exemplary embodiment of the system (e.g., FIG. 1). As shown in FIG. 1, the longer or longitudinal axis 44 of base 12 is substantially parallel to travel direction 48 of vehicle 30. In one embodiment, axis 44 of base 14 may be positioned 90 degrees relative to travel direction 48 of vehicle 30. Other angular orientations of the longitudinal axis 44 of the base 12 and travel direction 48 of vehicle 30 may be used so long as support structure 38 can support conduit 16 for removing frozen precipitation from the upper exterior surfaces of vehicles.

Figure 5:
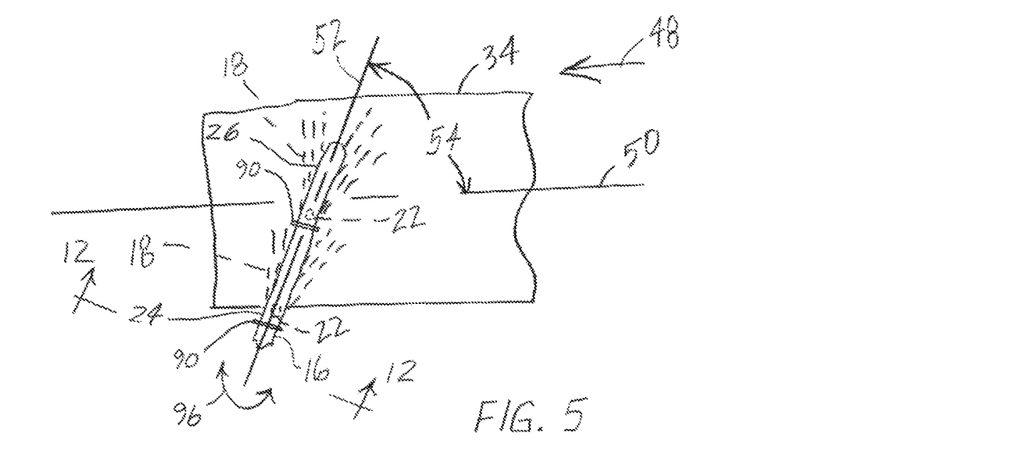
FIGS. 5-6 illustrate a partial plan view and a rear elevation view, respectively, of the snow and ice removal system of FIG. 1.
Figure 6:
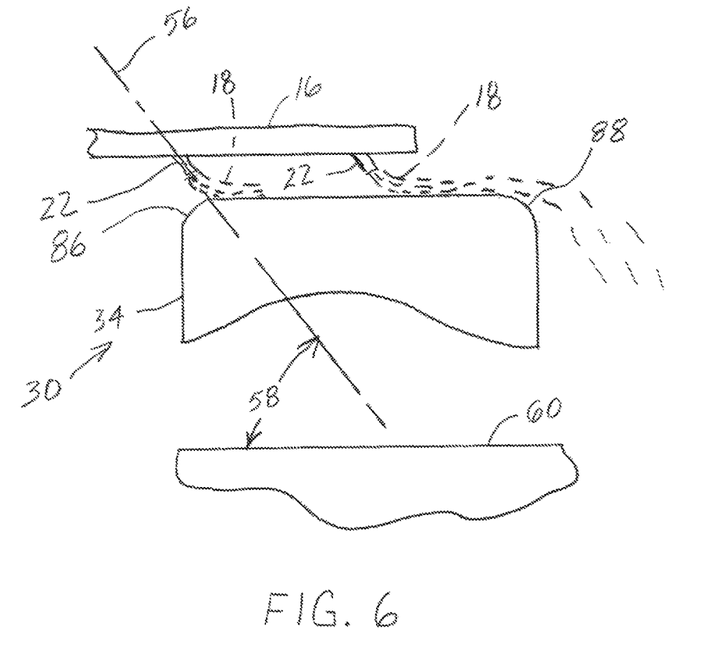

As further shown in FIGS. 1, 2, 5 and 6, a pair of nozzles 22 outwardly extend from conduit 16 for conveying pressurized air 18 onto an upper exterior surface of vehicle 30, such as semi-trailer 34 (FIG. 6). In one embodiment, nozzles 22 are "necked down" or include tapered openings having reduced cross-sectional areas, for focusing the flow of pressurized air 18 for most effectively removing frozen precipitation 20 from the upper exterior surface of vehicle 30. In one embodiment, conduit 16 having a diameter of 6 inches tapers to a pair of nozzles having a diameter of 3 inches. In other embodiments, the number of nozzles can be greater than or less than two, the number of conduits can be equal to or greater than one, and the cross sectional areas of the nozzles can be non-circular and even different from each other, depending upon the depth/density of frozen precipitation, as well as the speed of the vehicle relative to the system, or other factors. As collectively shown in FIGS. 1, 3 and 5, vehicle 30 slowly travels in a direction 48 (FIG. 3) along a longitudinal axis 50 relative to system 10. As further shown in FIG. 5, which is a plan view of the upper surface of trailer 34, a longitudinal axis 52 of the substantially horizontal portion of conduit 16 relative to longitudinal axis 50 of trailer 34 subtends an acute angle 54. In addition, as shown in FIG. 6, which is a partial forward-looking end view of semi-trailer 34, a longitudinal axis 56 of nozzle 22 and a support surface 60 (the ground surface that supports the wheels of the vehicle) subtend an acute angle 58. In one embodiment, angle 58 is between about 70 degrees and about 10 degrees, about 70 degrees and about 20 degrees, about 70 degrees and about 30 degrees, about 70 degrees and about 40 degrees, about 70 degrees and about 50 degrees, about 70 degrees and about 60 degrees, about 20 degrees, about 30 degrees, about 35 degrees, about 40 degrees, about 45 degrees, about 50 degrees, about 55 degrees, about 60 degrees, about 65 degrees, about 70 degrees or any sub-combination in between.

Figure 12:
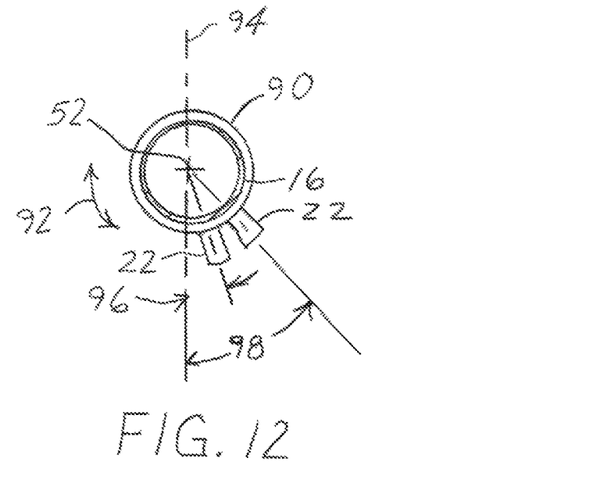
FIG. 12 illustrates a cross section taken along line 12-12 of FIG. 5 of a exemplary embodiment of a segment of a conduit of a snow and ice removal system.

As shown in FIGS. 5 and 12, segments 24, 26 of conduit 16 can be assembled together using an arrangement of locking clamps 90, such as by Nordfab, Inc., of Thomasville, N.C. As further shown in FIGS. 5 and 12, nozzles 22 of respective segments 24, 26 of conduit 16 may be subjected to selective rotational movement 92 about longitudinal axis 52 of conduit 16, independently positioning nozzles 22 at angles 96 and 98 relative to reference vertical axis 94, as desired.

It is to be understood that in one embodiment, one or more of nozzles 22 can extend from conduit 16 at an acute angle 54 that is different from at least one other nozzle 22 relative to longitudinal axis 50. In another embodiment, one or more of nozzles 22 can extend from conduit 16 at an acute angle 54 that is different from at least one other nozzle 22 relative to support surface 60. In another embodiment, one or more nozzles 22 can be selectively rotated about longitudinal axis 52 relative to vertical axis 94. In another embodiment, one or more of nozzles 22 can extend from conduit 16 at an acute angle 54 that is different from at least one other nozzle 22 relative to longitudinal axis 50, extend from conduit 16 at an acute angle 58 that is different from at least one other nozzle 22 relative to support surface 60, and/or extend from conduit 16 rotatably oriented about axis 52 at an angle 96 that is different from at least one other nozzle 22 relative to vertical axis 94.

Figure 7:
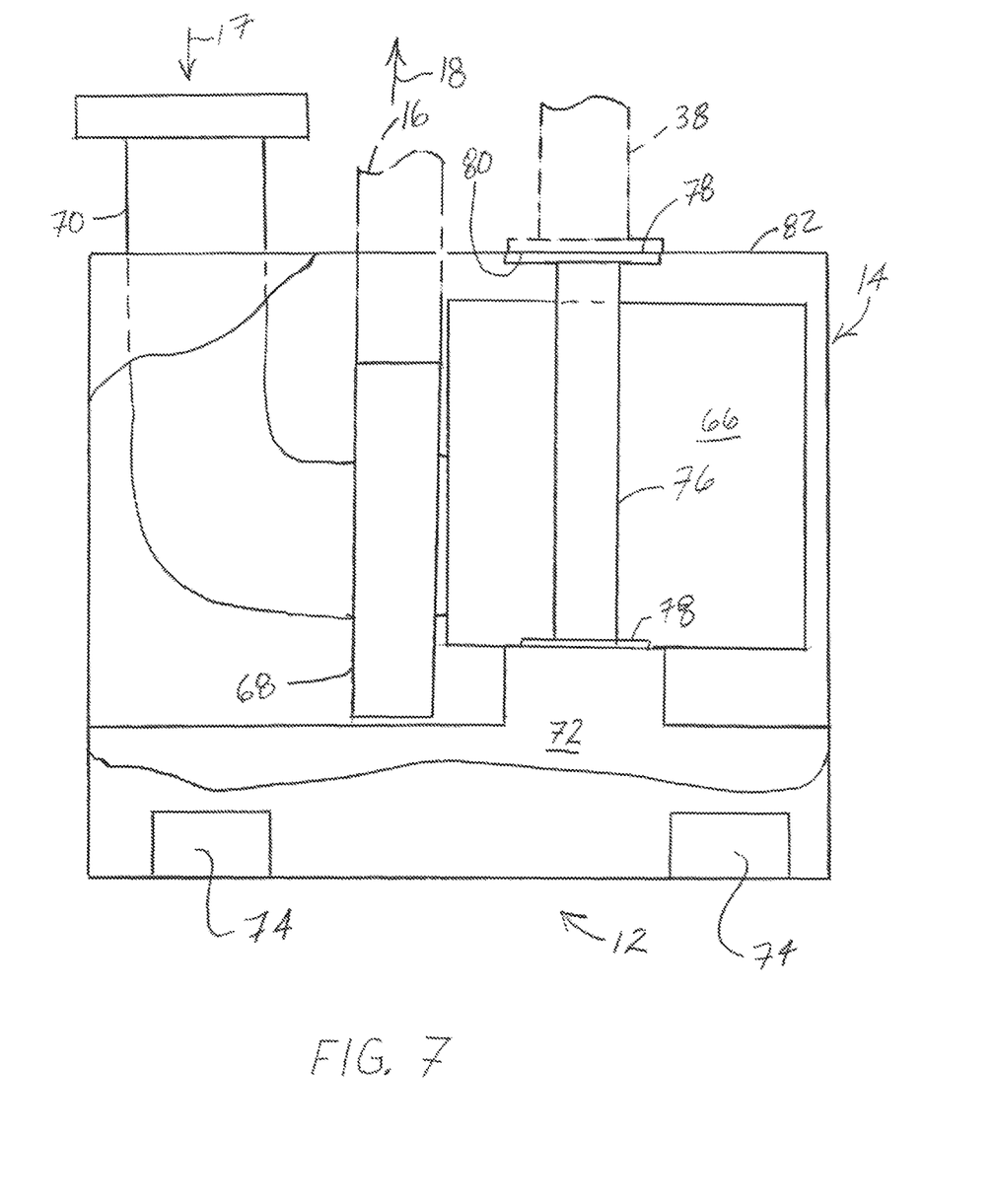
FIGS. 7-8 illustrate a partial cutaway side elevation view and a partial cutaway plan view, respectively, of an exemplary base of a snow and ice removal system.
Figure 8:
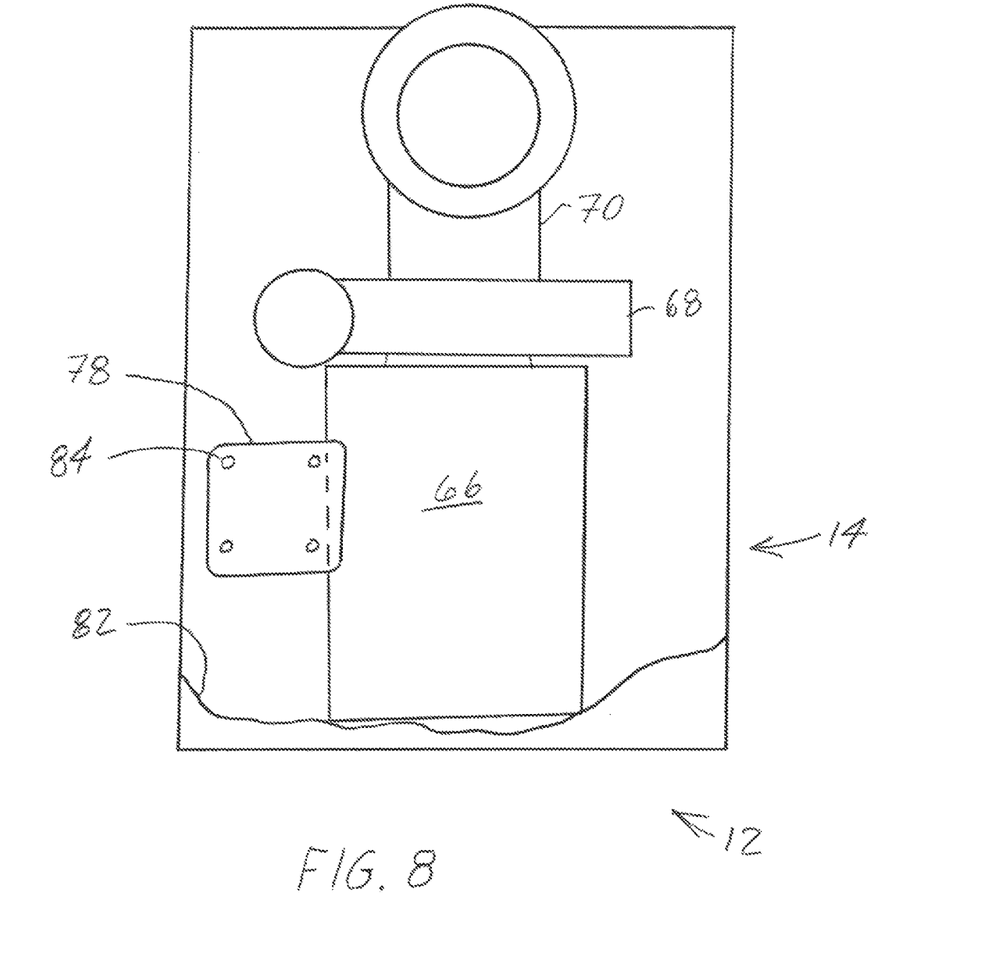

FIGS. 7 and 8 show a partial cutaway side elevation view and a partial cutaway plan view, respectively, of a base 12 of system 10. As further shown in FIGS. 7 and 8, base 12 houses and protectively encloses a device 14 for providing pressurized air 18 through conduit 16 (FIG. 1) to vehicle 30, such as an engine 66. Engine 66 may be a diesel engine that is drivingly connected to a blower 68 for drawing inlet air 17 from an inlet duct 70 into blower 68. Currently, many vehicles, such as tractor trailers, are powered by diesel fuel. As further shown in FIGS. 7 and 8, base 12 includes a chamber 72 that protectively secures and supports device 14, e.g., engine 66, blower 68 and inlet duct 70 within the base. Due to the arrangement of nozzles 22 (FIG. 6) directing pressurized air (and loosened frozen precipitation (FIG. 1)) away from base 12, the loosened or removed frozen precipitation inlet air 17 is substantially protected from entering inlet duct 70 of base 12. Stated another way, as shown in FIG. 6, nozzle 22 of conduit 16 is generally directed away from base 12 (FIG. 1) toward a proximal edge 86 of the upper exterior surface of vehicle 30 and the other nozzle 22 is directed between proximal edge 86 and a distal edge 88 of the upper exterior surface of vehicle 30. As a result, substantially all of the frozen precipitation is directed toward (and subsequently over) distal edge 88 of vehicle 30.

Base 12 includes a chamber 72 which is configured to store diesel fuel, or a fuel compatible with engine 66. Lifting features 74, such as a pair of slotted openings (FIG. 7) may be configured to receive lifting forks from a lifting device, such as a fork lift. In another embodiment, lifting features 74 may be grooves formed in the base, or cables or chains (not shown) secured to the base that are engagable by a lifting device. As a result of lifting features 74, system 10 is portable. For purposes herein, portable means that the snow and ice removal system, including the conduit and support structure installed in the base, can be moved in its entirety by a lifting vehicle engaging the lifting features formed in the base. That is, if the system is operating at one location of a facility and it is desirable to relocate the system to another location of the facility (assuming there is sufficient clearance for safe relocation), once the system has been shut off or deactivated (the engine turned off) the system can be immediately relocated by the lifting vehicle lifting the entire system by engaging the lifting features. Once relocated, the system can immediately resume operation. Alternately, such as during warmer, dry weather, the system may be removed, permitting a different use of the space formerly occupied by the snow and ice removal system.

In one embodiment, the system is self-contained. For purposes herein, self-contained means that the system does not require modification to itself, nor modification to location infrastructure in order for the system to be installed and operated as intended at the location. That is, the base of the system has sufficient weight, even without considering the weight of fuel in the base chamber, to provide stability and support for the conduit and support structure under normal operating conditions for removing frozen precipitation from the upper exterior surfaces of semi-trailers. Normal operating conditions, at the least, includes any environmental conditions under which a vehicle would make use of the system for removal of frozen precipitation from the vehicle prior to operating the vehicle on a public roadway. In an exemplary configuration for removing frozen precipitation from upper exterior surfaces of semi-trailers having a height of 13½ feet above the road surface, the lowest portion of conduit nozzles would normally be positioned approximately 14½ feet above the road surface.

Figure 11:
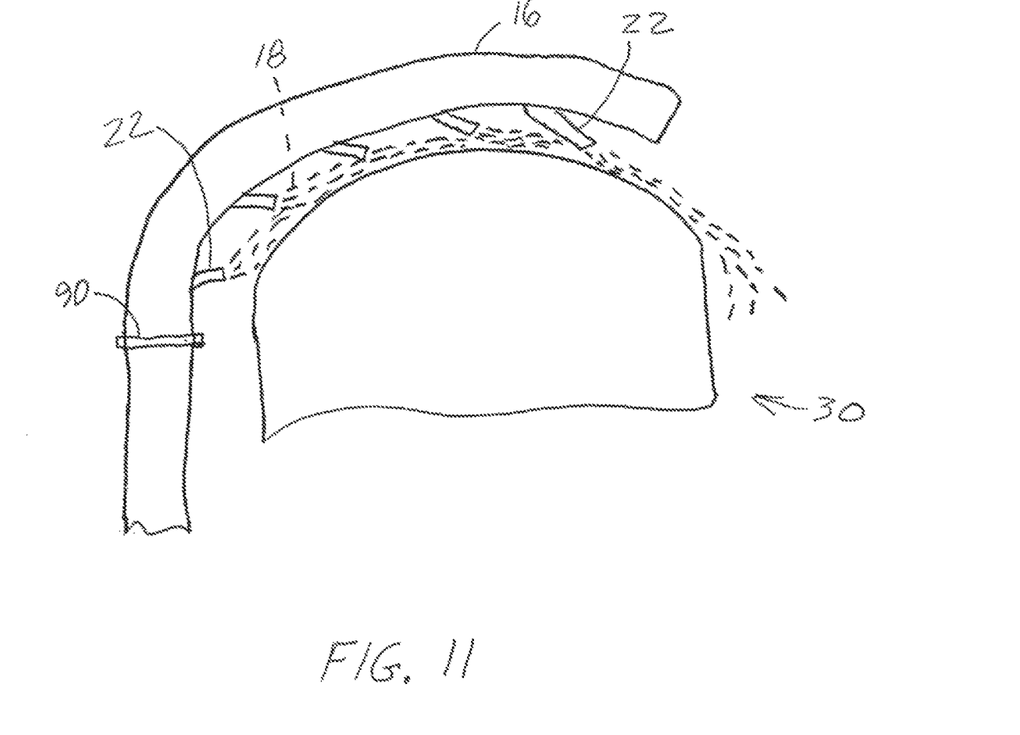
FIG. 11 illustrates a partial elevation rear view of an exemplary embodiment of a snow and ice removal system.

As shown in FIG. 11, conduit 16 and nozzles 22, and support structure (not shown) can be configured to more closely follow a height as well as a contour of an upper exterior surface of a vehicle. That is, a facility using only one fleet of vehicles may need a specially configured system with conduit 16 and nozzles 22 (and support structure 38; FIG. 1) that most effectively removes frozen precipitation from the upper exterior surface of the vehicles.

As shown in FIGS. 7 and 8, base 12 includes a structural member 76 having opposed flanges 78, in which the upper flange 78 structurally abuts an inner surface of an upper wall 82 (shown mostly cutaway in FIG. 8) of base 12. As further shown in FIGS. 7 and 8, openings may be formed in upper wall 82 corresponding to openings 84 formed in flange 78 of structural member 76, permitting fasteners (not shown) to interconnect and secure flange 80 of support structure 38 to base 12.

It is to be understood that vehicles having operating heights different from 13½ feet may require nozzle heights having similarly correspondingly different heights to provide effective removal of frozen precipitation therefrom.

Figure 9:
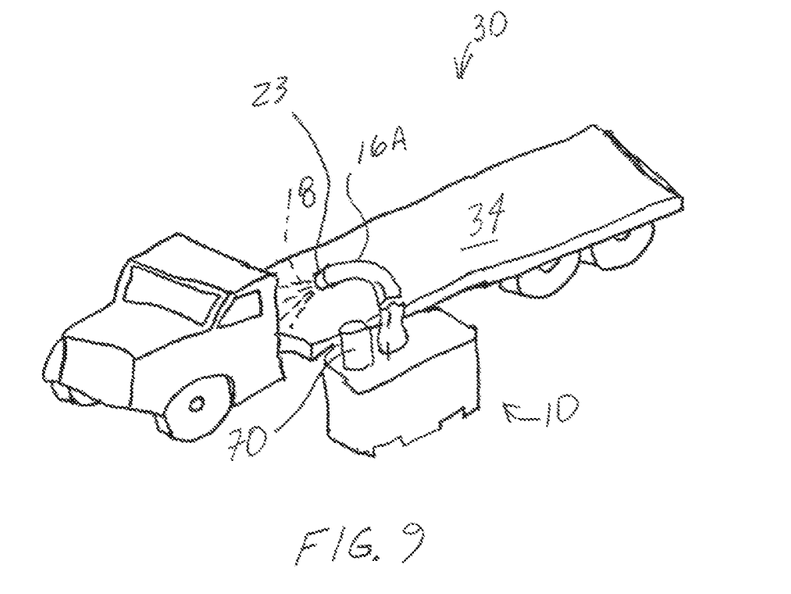
FIGS. 9-10 illustrate an upper perspective view and a front elevation view, respectively, of an exemplary embodiment of a snow and ice removal system.
Figure 10:
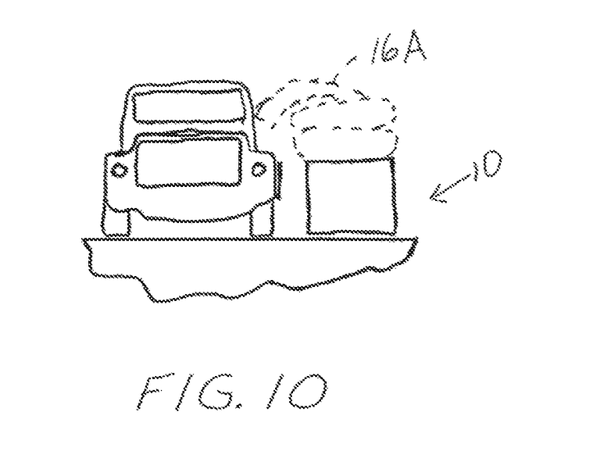

For example, as shown in FIGS. 9 and 10, the upper exterior surface 34 of vehicle 30 in need of removal of frozen precipitation is a flat bed trailer. In this embodiment, an extended length of flexible conduit 16A terminating in a nozzle 23 can be used by an operator to remove the frozen precipitation, and does not require a support structure, with the conduit being wrapped around, for example, inlet duct 70, when the system is not operating. In one embodiment, the system may include both a flexible conduit 16A in addition to support structure 38 and conduit 16 combination previously disclosed. In this combined arrangement, a diverter valve (not shown) could be used to selectively provide pressurized air to the appropriate conduit 16, 16A for removal of frozen precipitation from the vehicle surface.

In one embodiment, support structure 38 (FIG. 1) can include illumination sources 100 or lights to illuminate the system and area in close proximity to the system. In one embodiment, the power source may be one or more additional alternators (not shown), such as driven by one or more drive belts of engine 66. In one embodiment, the system may include electrical cable(s) for connecting to an electrical power source provided at the location at which the system is positioned.

The snow and ice removal system of the present disclosure may include a payment feature, allowing a user to operate the system when a predetermined amount of money in one or more forms, such as cash or credit card is provided.

The snow and ice removal system of the present disclosure is a portable, self-contained unit for assisting vehicle operators with complying with the laws of multiple jurisdictions, which should result in reducing fines as well as a reduction in accidents resulting from frozen precipitation flying off of vehicle roofs or upper exterior surfaces of the vehicles, and thereby should further result in a reduction of insurance rates for those using the system. In addition, the portable, self-contained construction provides a system requiring minimum installation costs, and providing increased flexibility and utility of facility space.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

The invention claimed is:

1. A snow and ice removal system for removing frozen precipitation from an exterior surface of a vehicle, comprising:
   a base having an upper surface, the base protectively enclosing a blower for pressurizing air;
   an inlet duct in fluid communication with the blower, the inlet duct extending through the upper surface; and
   a conduit having a fixed shape and extending through the upper surface for conveying pressurized air from the blower to an upper exterior surface of a vehicle, the conduit having a plurality of nozzles, each nozzle extending from the conduit at a first acute angle relative to a second support surface supporting the vehicle;
   a support structure having opposed ends and secured to the conduit, the support structure resembling an inverted "L", one end of the support structure secured to the upper surface;
   wherein the system is portable and self-contained;
   wherein the base is configured to hold a liquid fuel source for an engine drivingly connected to the blower;
   wherein the base is positioned on a first side of the vehicle opposite a second side of the vehicle, and substantially all frozen precipitation on the upper exterior surface of the vehicle is directed along the upper exterior surface of the vehicle by the pressurized air from the first side to the second side, substantially protecting the inlet duct from ingesting the removed frozen precipitation.

2. The system of claim 1, wherein the support structure comprises a substantially vertical first portion having one end secured to the upper surface and a substantially horizontal second portion secured to the other end of the first portion.

3. The system of claim 1, wherein the base includes lifting features configured to be received by a lifting device for transporting the system.

4. The system of claim 3, wherein the lifting device includes a lifting fork for engaging the lifting features.

5. The system of claim 1, wherein the plurality of nozzles extending from the conduit at a second acute angle relative to a longitudinal axis of the vehicle.

6. The system of claim 5, wherein at least one nozzle extends from the conduit at a first acute angle that is different from the first acute angle of another nozzle.

7. The system of claim 5, wherein at least one nozzle extends from the conduit at a second acute angle that is different from the second acute angle of another nozzle.

8. The system of claim 5, wherein the first acute angle is about 30 degrees.

9. A snow and ice removal system for removing frozen precipitation from an exterior surface of a vehicle, comprising:
- a base having an upper surface, the base protectively enclosing a blower for pressurizing air;
- an inlet duct in fluid communication with the blower, the inlet duct extending through the upper surface; and
- a conduit having a fixed shape and extending through the upper surface and in uninterrupted fluid communication with the blower for conveying pressurized air from the blower to an upper exterior surface of a vehicle, the conduit having a plurality of nozzles, each nozzle extending from the conduit at a first acute angle relative to a second support surface supporting the vehicle; and
- a support structure having opposed ends and secured to the conduit, one end of the support structure being secured to the upper surface;

wherein the support structure comprises a substantially vertical first portion having one end secured to the upper surface and a substantially horizontal second portion secured to the other end of the first portion, the support structure resembling an inverted "L";

wherein the system is portable and self-contained;

wherein the base is configured to hold a liquid fuel source for an engine drivingly connected to the blower;

wherein the base is positioned on a first side of the vehicle opposite a second side of the vehicle, and substantially all frozen precipitation on the upper exterior surface of the vehicle is directed along the upper exterior surface of the vehicle by the pressurized air from the first side to the second side, substantially protecting the inlet duct from ingesting the removed frozen precipitation.

10. The system of claim 9, wherein the base includes lifting features configured to be received by a lifting device for transporting the system;
wherein the lifting device includes a lifting fork for engaging the lifting features.

11. The system of claim 9, wherein at least one nozzle extends from the conduit at a first acute angle that is different from the first acute angle of another nozzle;
wherein at least one nozzle extends from the conduit at a second acute angle that is different from the second acute angle of another nozzle.

* * * * *